United States Patent
Chen et al.

(10) Patent No.: US 6,956,737 B2
(45) Date of Patent: Oct. 18, 2005

(54) DISK DRIVE MOUNTING ASSEMBLY

(75) Inventors: Jung-Chi Chen, Tu-Chen (TW); Xi-Hua Jiang, Shenzhen (CN)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 110 days.

(21) Appl. No.: 10/461,111

(22) Filed: Jun. 13, 2003

(65) Prior Publication Data

US 2004/0125556 A1 Jul. 1, 2004

(30) Foreign Application Priority Data

Dec. 27, 2002 (TW) .................................... 91221268 U

(51) Int. Cl.⁷ .................................................. G06F 1/16
(52) U.S. Cl. .................................... 361/685; 312/223.1
(58) Field of Search .............................. 361/683–685, 361/724, 735, 727–729; 312/223.1, 223.2, 332.1, 333

(56) References Cited

U.S. PATENT DOCUMENTS

| | | | |
|---|---|---|---|
| 5,136,466 A | * | 8/1992 | Remise et al. .............. 361/685 |
| 5,349,483 A | | 9/1994 | Tsai et al. |
| 5,587,879 A | * | 12/1996 | Spano et al. ................ 361/685 |
| 5,768,099 A | * | 6/1998 | Radloff et al. .............. 361/685 |
| 6,317,318 B1 | * | 11/2001 | Kim ........................... 361/685 |
| 6,377,449 B1 | * | 4/2002 | Liao et al. .................. 361/685 |
| 6,721,177 B1 | * | 4/2004 | Wang et al. ................ 361/685 |

* cited by examiner

Primary Examiner—Lynn Feild
Assistant Examiner—Anthony Q. Edwards
(74) Attorney, Agent, or Firm—Wei Te Chung

(57) ABSTRACT

A disk drive mounting assembly includes a chassis (16), a first receiving cage (20), a mounting bracket (50) and a second receiving cage (60). The disk drive (10) comprises two pairs of sliding posts (12). The first cage for receiving the disk drive is generally U-shaped and has two side walls (23, 24). Each side wall defines a pair of slots (26, 32) for accommodating the sliding posts of the disk drive. The mounting bracket (50) pivotably attached to the first cage includes a pressing body (52) and a pair of fixing arms (54) depending from the pressing body. Each fixing arm defines a fixing cutout (56) for restraining the sliding posts. The second cage is attached to the chassis on the mounting bracket to prevent the disk drive from moving in vertical directions.

15 Claims, 4 Drawing Sheets

US 6,956,737 B2

DISK DRIVE MOUNTING ASSEMBLY

BACKGROUND OF THE INVENTION

1. Field of the Invention

The present invention relates to a mounting assembly for a computer disk drive, and more particularly to a disk drive mounting assembly with a simplified configuration.

2. Description of Related Art

Various data storage devices are installed in electronic apparatuses for communication and handling of data. Such devices include, for example, hard disk drives, floppy disk drives and CD-ROM (Compact Disk-Read Only Memory) drives.

A conventional disk drive is directly mounted to a computer case with a plurality of screws. A typical disk drive mounting assembly is disclosed in U.S. Pat. No. 5,349,483. The mounting assembly comprises a receptacle and a cover. The receptacle defines an opening at a top thereof, and four screw holes at four corners thereof. A top face of the disk drive also defines a plurality of screw holes. The cover defines a plurality of fixing holes along two side edges thereof. A plurality of screws is extended through the fixing holes of the cover and engaged in the screw holes of the disk drive so as to connect the cover with the disk drive. Four screws are extended through the screw holes of the receptacle, thereby mounting the disk drive in the receptacle with the cover covering the opening of the receptacle. The receptacle containing the disk drive is then mounted to the computer case.

The above-described assembly procedure utilizing a plurality of screws is unduly laborious and time-consuming. In addition, when the disk drive is to be maintained or changed, it is necessary to dismount the disk drive from the computer case. This is unduly time-consuming. In addition, a tool such as a screwdriver is required to disengage the combined cover and disk drive from the receptacle, which process is unduly inconvenient. Moreover, using the screwdriver in the limited space of the computer case is problematic.

SUMMARY OF THE INVENTION

Accordingly, an object of the present invention is to provide a mounting assembly with a simplified configuration, and which is convenient to use.

To achieve the above object, a disk drive mounting assembly of the present invention includes a chassis, a first receiving cage, a mounting bracket and a second receiving cage. The disk drive comprises two pairs of sliding posts. The first cage for receiving the disk drive is generally U-shaped and has two side walls. Each side wall defines a pair of slots for accommodating the sliding posts of the disk drive. The mounting bracket pivotably attached to the first cage includes a pressing body and a pair of fixing arms depending from the pressing body. Each fixing arm defines a fixing cutout for restraining the sliding posts. The second cage is attached to the chassis on the mounting bracket to prevent the disk drive from moving in vertical directions.

Other objects, advantages and novel features of the present invention will be drawn from the following detailed description of preferred embodiment of the present invention with the attached drawings, in which:

DESCRIPTION OF THE PREFERRED EMBODIMENT

Figure 1:
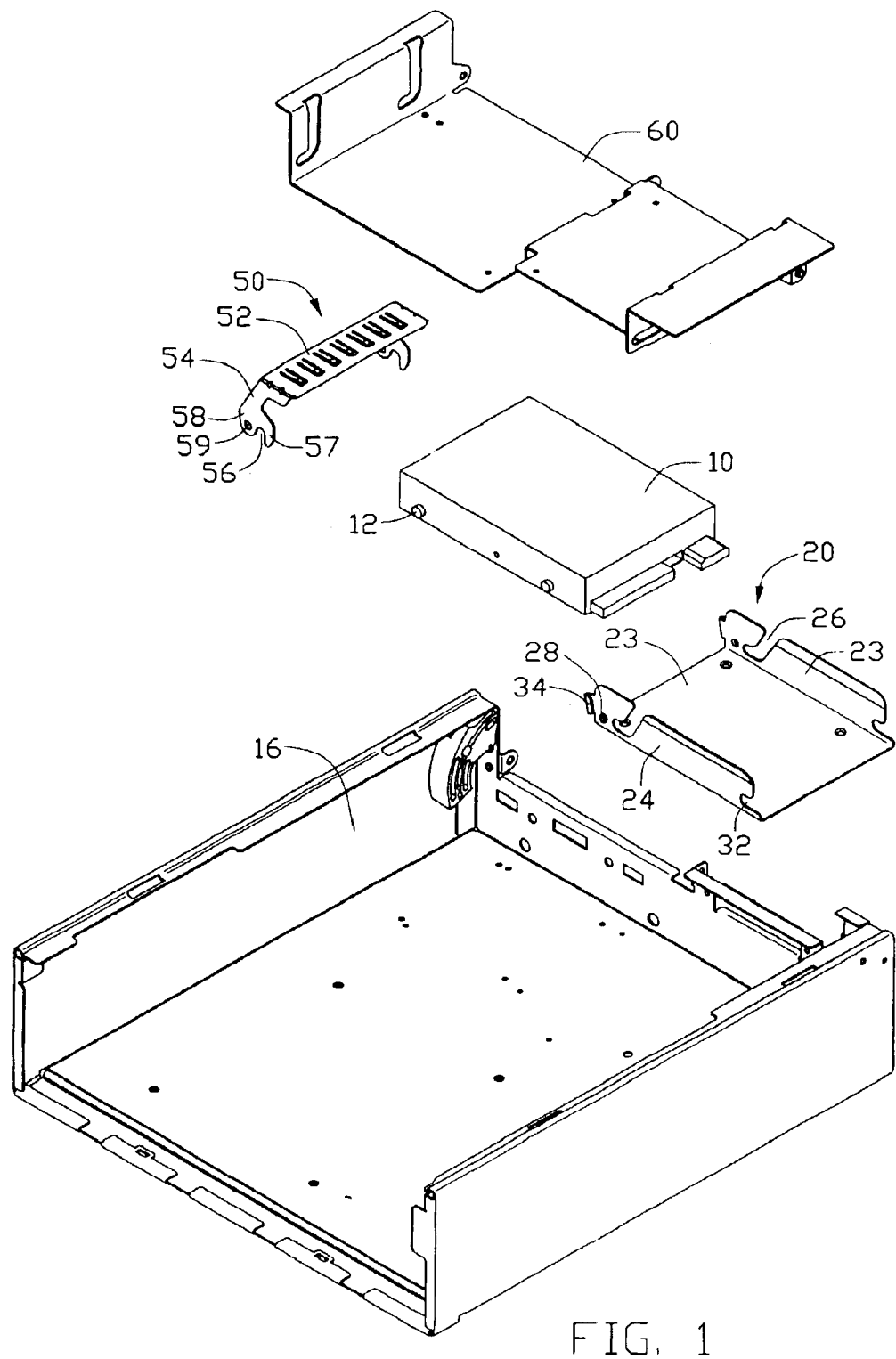
FIG. 1 is an exploded, isometric view of a disk drive mounting assembly in accordance with a preferred embodiment of the present invention, together with a disk drive.

FIG. 1 shows a disk drive mounting assembly in accordance with the present invention, together with a disk drive 10. The disk drive mounting assembly comprises a chassis 16, a first receiving cage 20, a mounting bracket 50, and a second receiving cage 60.

The disk drive 10 forms two pairs of sliding posts 12 on opposite sides thereof. One pair of the sliding posts 12 is located near a rear portion of the disk drive 10, and the other pair of the sliding posts 12 is located near a rear of the disk drive 10. Each sliding post 12 is a low-profile cylinder.

The first cage 20 is for receiving the disk drive 10, and is fixed to the chassis 16. The first cage 20 is generally U-shaped, and comprises a base 22 riveted on the chassis 16. Two side walls 23, 24 extend upwardly from opposite side edges of the base 22. Each side wall 23, 24 defines a dogleg-shaped rear slot 26 in a rear end thereof, and a front slot 32 in a front end thereof. Each rear slot 26 comprises an open slanted guiding portion (not labeled), and a blind sliding portion (not labeled) contiguous with the guiding portion and being parallel to the base 22. Each front slot 32 preferably has a linear configuration parallel to the base 22. Alternatively, each front slot 32 can have a dogleg-shaped configuration similar to that of either rear slot 26. Each side wall 23, 24 outwardly forms a pivot post 28 between the rear slot 26 and a rear end thereof. The rear end of each side wall 23, 24 extends rearward and then bends back outwardly and forwardly to form a stop 34.

The mounting bracket 50 is pivotably attached to a rear of the first cage 20. The mounting bracket 50 comprises an elongate pressing body 52. Two fixing arms 54 depend from opposite ends of the pressing body 52 respectively. Each fixing arm 54 defines a fixing cutout 56 in a bottom end thereof. A first blocking portion 57 and a second blocking portion 58 are defined in the fixing arm 54 at opposite sides of the fixing cutout 56 respectively. The second blocking portion 58 defines a pivot hole 59, for pivotably receiving a corresponding pivot post 28 of the first cage 20.

The second cage 60 can be used for mounting CD-ROM drives or floppy disk drives therein.

Figure 2:
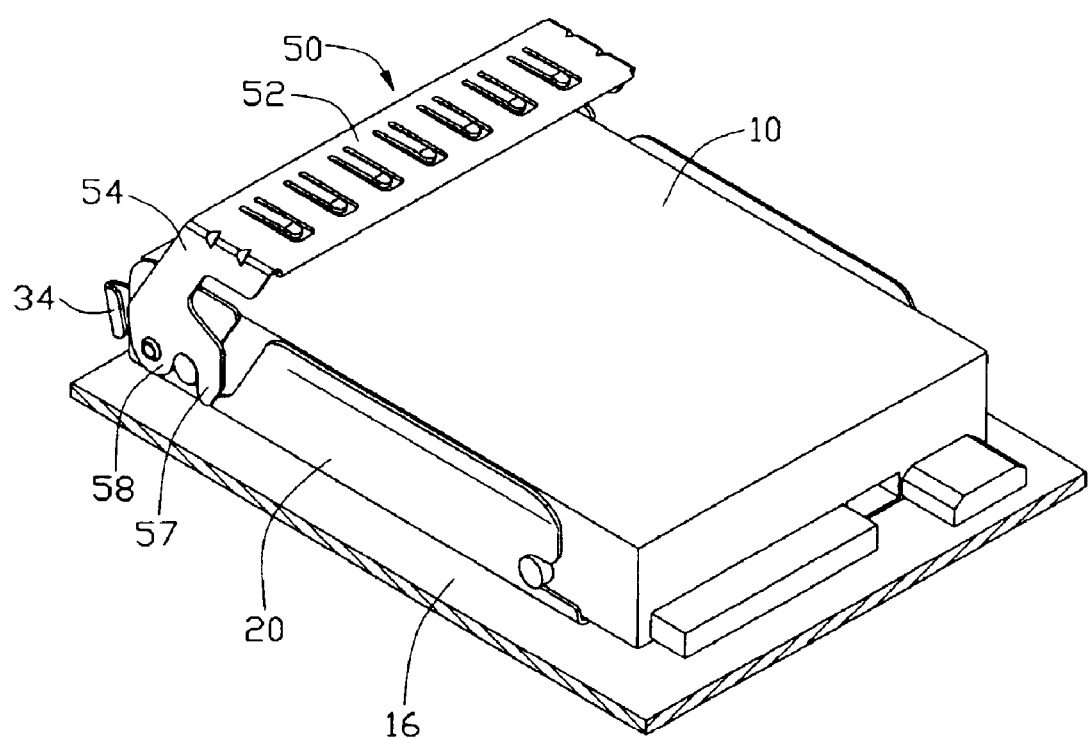
FIG. 2 is an enlarged, isometric view of the disk drive and a first receiving cage of the mounting assembly of FIG. 1 assembled together, and showing part of a chassis of the mounting assembly thereunder.
Figure 3:
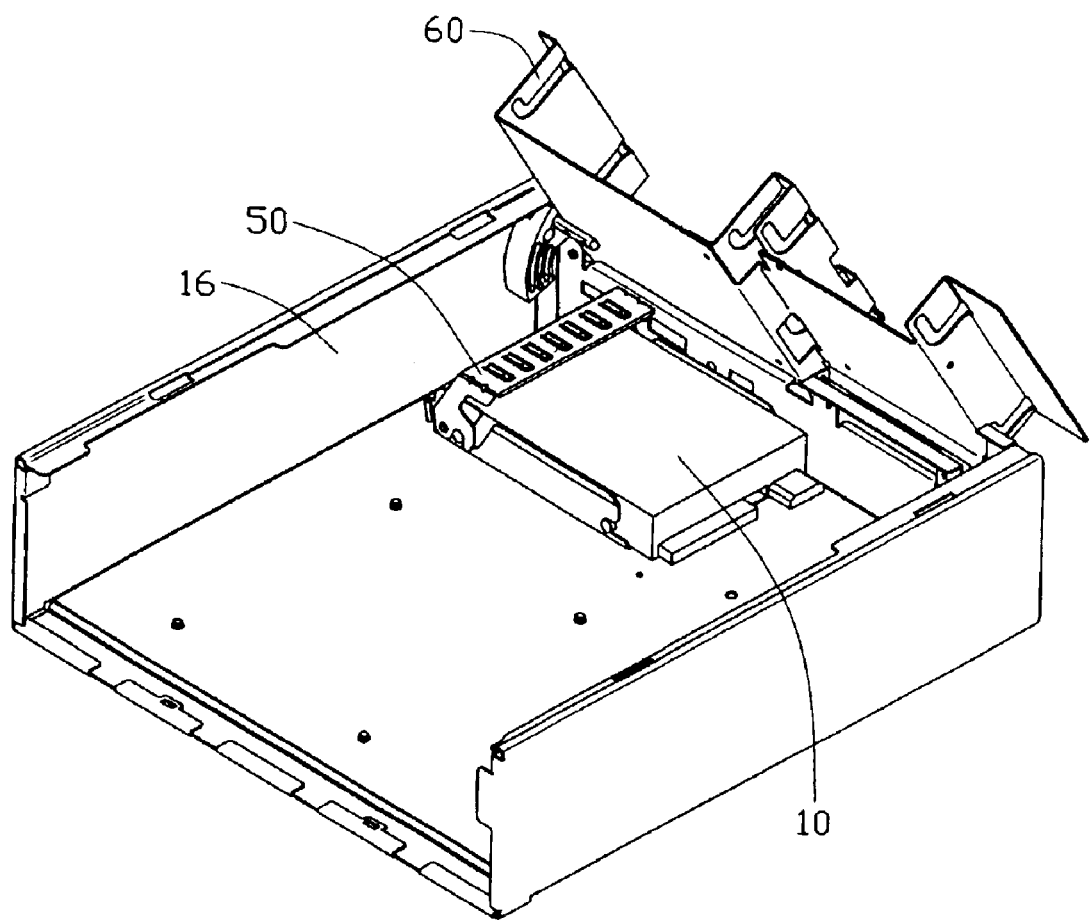
FIG. 3 is an assembled view of FIG. 1, showing a second receiving cage of the mounting assembly at an uppermost position.
Figure 4:
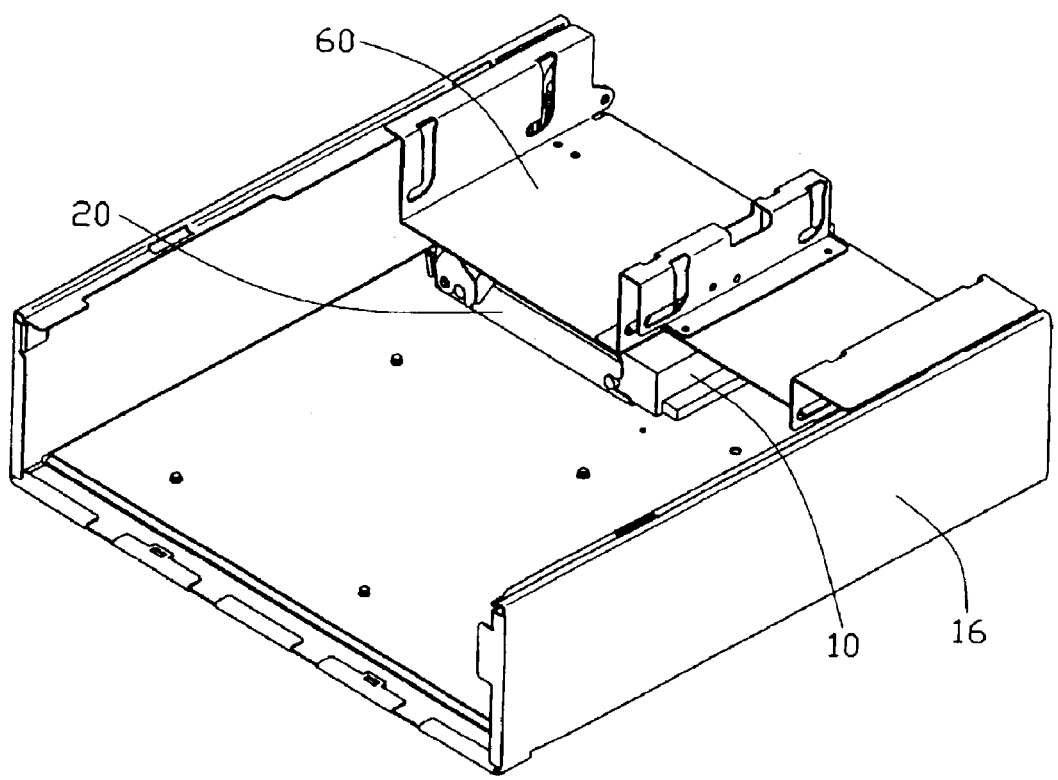
FIG. 4 is similar to FIG. 3, but showing the second receiving cage at a lowermost position.

Referring to FIGS. 2–3, in assembly, the first cage 20 is riveted on the chassis 16. The mounting bracket 50 is pivotably mounted to the rear of the first cage 20, with the pivot posts 28 of the first cage 20 being pivotably received in the pivot holes 59 of the mounting bracket 50. The mounting bracket 50 is rotated rearward so that the fixing arms 54 are engaged in the stops 34. The rear pair of sliding posts 12 of the disk drive 10 is slid along the rear slots 26 downwardly and then rearward, and simultaneously the front pair of sliding posts 12 of the disk drive 10 is slid into the front slots 32. The rear pair of sliding posts 12 reaches rear ends of the rear slots 26. The mounting bracket 50 is rotated forwardly until the fixing cutouts 56 engagingly receive the rear pair of sliding posts 12. In this position, the pressing body 52 of the mounting bracket 50 is parallel to a top face (not labeled) of the disk drive 10. Referring to FIGS. 3–4, the second cage 60 is pivotally mounted to the chassis 16, and is rotated downward until it presses on the pressing body 52. The second cage 60 thereby prevents the disk drive 10 from moving in vertical directions.

While the present invention has been illustrated by the description of preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting assembly for mounting a disk drive having a plurality of sliding members in a computer chassis, the mounting assembly comprising:

a first receiving cage adapted for being attached in the chassis, the cage comprising a base and two side walls, each of the side walls defining a plurality of slots for receiving corresponding sliding members of the disk drive, at least one slot of the first receiving cage comprising a slanted guiding portion and a sliding portion parallel to the base;

a mounting bracket pivotally mounted to the rear portions of the first receiving cage, the mounting bracket comprising a pressing body and two fixing arms respectively depending from the pressing body, each of the fixing arms defining a cutout receiving a corresponding sliding member of the disk drive;

wherein the mounting bracket is pivotable between a first position in which the sliding members are engaged in the corresponding cutouts and the disk drive is located in a locked position, and a second position in which the sliding members are released from the corresponding cutouts and the disk drive is located in an unlocked position.

2. The mounting assembly as claimed in claim 1, further comprising a second receiving cage located on the pressing body of the mounting bracket for preventing the disk drive from moving from the first position.

3. The mounting assembly as claimed in claim 1, wherein the slot comprise a pair of rear slots located in rear portion of the side walls of the first receiving cage respectively, and each of the rear slots is generally dogleg-shaped.

4. The mounting assembly as claimed in claim 1, wherein the slots comprise a pair of front slots located in front portions of the side walls of the first receiving cage respectively, and each of the front slots is linear and parallel to the base.

5. The mounting assembly as claimed in claim 1, wherein each of the side walls of the first receiving cage forms a stop at a rear end thereof, and the mounting bracket abuts the stops in the unlocked position.

6. The mounting assembly as claimed in claim 5, wherein each of fixing arms of the mounting bracket defines a pivot hole, and each of the side walls of the first receiving cage forms a pivot located between the stop and a rearmost one of the slots, the pivots being pivotably received in the corresponding pivot holes.

7. A computer case comprising:

a chassis;

a first receiving cage attached in the chassis, the first receiving cage comprising two side walls, each of the side walls defining a plurality of slots, at least one slot of the first receiving care comprising a slanted guiding portion and a sliding portion parallel to the base;

a disk drive received in the first receiving cage, the disk drive comprising a plurality of sliding members received in corresponding slots of the first receiving cage; and a mounting bracket pivotably attached to the first receiving cage, the mounting bracket comprising a pressing body and two fixing arms respectively depending from opposite ends of the pressing body, each of the fixing arms defining a cutout engagingly receiving a corresponding sliding member of the disk drive thereby securing the disk drive to the first receiving cage.

8. The computer case as claimed in the claim 7, wherein each of the fixing arms forms a first blocking portion and a second blocking portion at opposite sides of the cutout respectively.

9. The computer case as claimed in the claim 8, wherein each of the second blocking portions defines a pivot hole, and each of the side walls of the first receiving cage forms a pivot, the pivots being pivotably engaged in the corresponding pivot holes thereby pivotably connecting the mounting bracket to the first receiving cage.

10. The computer case as claimed in the claim 7, further comprising a second receiving cage attached to the chassis and located on the pressing body of the mounting bracket, for retaining the disk drive in the chassis.

11. The mounting assembly as claimed in claim 1, wherein the slot comprise a pair of rear slots located in rear portion of the side walls of the first receiving cage respectively, and each of the rear slots is generally dogleg-shaped.

12. The computer case as claimed in the claim 7, wherein the slots comprise a pair of front slots located in front portions of the side walls of the first receiving cage respectively, and each of the front slots is linear and generally parallel to the first receiving cage.

13. A computer casing assembly comprising:

a chassis including a bottom panel;

a first cage fixed to the bottom panel; the first cage comprising a base and two side walls, each of the side walls defining a plurality of slots for receiving corresponding sliding members of the disk drive, at least one slot of the first cage comprising a slanted guiding portion and a sliding portion parallel to the base;

a disk drive generally horizontally sliding into and received in the cage;

a mounting bracket pivotally mounted on the first cage and prohibiting said disk drive from withdrawal therefrom when said mounting bracket is in a fixed position; and a second cage pivotally mounted to the chassis and above said first cage; wherein said second cage retains said mounting bracket in the fixed position when said second cage is located in a final assembling position.

14. The assembly as claimed in claim 13, wherein a direction of a pivotal axis of said mounting bracket is perpendicular to that of another pivotal axis of said second cage.

15. The assembly as claimed in claim 14, wherein a sliding direction of said disk drive relative to the first cage is parallel to the direction of the pivotal axis of the second cage.

* * * * *